(12) United States Patent
Ukai et al.

(10) Patent No.: US 9,221,394 B2
(45) Date of Patent: Dec. 29, 2015

(54) LIGHTING DEVICE FOR VEHICLE

(75) Inventors: Yasuhiro Ukai, Aichi-ken (JP);
Hiroyasu Tahara, Aichi-ken (JP);
Takahiro Sugioka, Aichi (JP); Ryuuji Fukui, Aichi (JP)

(73) Assignees: TOYOTA BOSHOKU KABUSHIKI KAISHA, Aichi-Ken (JP); TOYOTA SHATAI KABUSHIKI KAISHA, Aichi (JP)

( * ) Notice: Subject to any disclaimer, the term of this patent is extended or adjusted under 35 U.S.C. 154(b) by 56 days.

(21) Appl. No.: 13/988,633

(22) PCT Filed: Sep. 4, 2012

(86) PCT No.: PCT/JP2012/072442
§ 371 (c)(1),
(2), (4) Date: May 21, 2013

(87) PCT Pub. No.: WO2013/054612
PCT Pub. Date: Apr. 18, 2013

(65) Prior Publication Data
US 2013/0242581 A1     Sep. 19, 2013

(30) Foreign Application Priority Data

Oct. 13, 2011  (JP) .................................. 2011-225774

(51) Int. Cl.
*B60Q 1/00* (2006.01)
*B60Q 3/02* (2006.01)
*B60Q 3/00* (2006.01)

(52) U.S. Cl.
CPC .............. *B60Q 3/0233* (2013.01); *B60Q 3/004* (2013.01)

(58) Field of Classification Search
CPC .... B60Q 3/0233; B60Q 3/0216; B60Q 3/004; B60Q 3/00223; B60Q 3/0276; F21V 21/40; F21V 33/0084; F21W 2101/02

USPC .................................................. 362/459, 501
See application file for complete search history.

(56) References Cited

U.S. PATENT DOCUMENTS 4,788,630 A * 11/1988 Gavagan ........................ 362/501
6,000,822 A * 12/1999 Polizzi et al. ................. 362/488
(Continued)

FOREIGN PATENT DOCUMENTS

| EP | 2325047 A1 | 5/2011 |
|---|---|---|
| JP | 2005-247317 | 9/2005 |

(Continued)

OTHER PUBLICATIONS

WIPO International Search Report dated Nov. 20, 2013.
(Continued)

*Primary Examiner* — Anh Mai
*Assistant Examiner* — Matthew J Peerce
(74) *Attorney, Agent, or Firm* — Greenblum & Bernstein, P.L.C.

(57) ABSTRACT

A lighting device for a vehicle is provided to a vehicular door trim to illuminate a handle housing portion in which an inside handle is housed. The lighting device includes a light exit member, a light exit member mount member provided on an upper side of the inside handle and on which the light exit member is arranged, and a light transmission portion provided to the light exit member mount member and through which light from the light exit member is directed to the handle housing portion. The light exit member is arranged on a vehicular compartment inner side than the light transmission portion.

20 Claims, 6 Drawing Sheets

(56) References Cited

U.S. PATENT DOCUMENTS

| | | | |
|---|---|---|---|
| 6,550,946 B2* | 4/2003 | Misawa et al. | 362/501 |
| 6,974,134 B1* | 12/2005 | Macri et al. | 296/1.02 |
| 7,607,809 B2* | 10/2009 | Misawa | 362/501 |
| 8,333,492 B2* | 12/2012 | Dingman et al. | 362/501 |
| 8,356,921 B2* | 1/2013 | Fujita | 362/501 |
| 8,403,551 B2* | 3/2013 | Kino et al. | 362/609 |
| 8,807,806 B2* | 8/2014 | Hayashi et al. | 362/501 |
| 2001/0006465 A1 | 7/2001 | Misawa et al. | |
| 2005/0219854 A1* | 10/2005 | Grady | 362/490 |
| 2011/0170304 A1 | 7/2011 | Fujita | |
| 2011/0241544 A1* | 10/2011 | Murray et al. | 315/77 |
| 2012/0314438 A1* | 12/2012 | Gutt et al. | 362/511 |
| 2013/0094233 A1 | 4/2013 | Ukai et al. | |
| 2014/0204599 A1* | 7/2014 | Miura et al. | 362/501 |

FOREIGN PATENT DOCUMENTS

| | | |
|---|---|---|
| JP | 2006-8056 | 1/2006 |
| WO | 2010/032746 | 3/2010 |

OTHER PUBLICATIONS

U.S. Appl. No. 13/988,589 to Yasuhiro Ukai et al., filed May 21, 2013.

Extended European Search Report in EP 12840695.6, dated May 6, 2015.

Notification of Reasons for Refusal in JP Application No. 2011-225774, with English language translation, mailed Feb. 3, 2015.

Chinese Office Action in CN 201280004409, with English language translation, mail date is Jan. 29, 2015.

* cited by examiner

LIGHTING DEVICE FOR VEHICLE

TECHNICAL FIELD

The present disclosure relates to a lighting device for a vehicle.

BACKGROUND ART

A lighting device for a vehicle that illuminates an inside handle mounted to a vehicular door is known (for example, as described in Patent Document 1). The lighting device described in Patent Document 1 includes a light source (a light exit member) is provided on an upper side of the inside handle to illuminate the inside handle from an upper side. With this configuration, the inside handle is easily seen and operated.

[Patent Document 1] Japanese Unexamined Patent Publication No. 2005-247317

Problem to be Solved by the Invention

In the above configuration, the inside handle is illuminated from the upper side and accordingly, the light reflecting off the inside handle is illuminated to a vehicular compartment inner side. This may cause the light exit member to be seen on a surface (an upper surface) of the inside handle.

DISCLOSURE OF THE PRESENT INVENTION

The present technology has been made in view of the aforementioned circumstances. An objective of the present invention is to provide a lighting device for a vehicle in which a light exit member is less likely to be seen on a surface of the inside handle.

Means for Solving the Problem

A technology described herein relates to a lighting device for a vehicle provided to a vehicular door trim to illuminate a handle housing portion in which an inside handle is housed. The lighting device includes a light exit member, a light exit member mount member provided on an upper side of the inside handle and on which the light exit member is arranged, and a light transmission portion provided to the light exit member mount member and through which light from the light exit member is directed to the handle housing portion. The light exit member is arranged on a vehicular compartment inner side than the light transmission portion.

According to the present technology, the light exiting from the light exit member is directed toward the handle housing portion via the light transmission portion. Accordingly, the inside of the handle housing portion is illuminated by the light and the inside handle can be seen effectively. The light exit member is arranged in the light exit member mount member on the vehicular compartment inner side than the light transmission portion. With this configuration, the light exiting from the light exit member toward the vehicular compartment outer side is directed to the handle housing portion. Namely, the light exiting from the light exit member toward the vehicular compartment inner side is less likely to be illuminated directly to the inside handle. Accordingly, the light exiting from the light exit member is less likely to reflect off the inside handle to be directed to the vehicular compartment inner side. From a passenger's view who is in the vehicular compartment inner side, the light exit member is less likely to be seen on the surface of the inside handle and the passenger is less likely to feel brightness.

In the above configuration, the light exit member may be arranged so as not to be shifted from the inside handle in a vehicular compartment inner-outer direction or so as to be on the vehicular compartment inner side than the inside handle.

With such a configuration, the light exiting from the light exit member and directing to the vehicular compartment inner side is less likely to illuminate the inside handle directly. Accordingly, the light is less likely to reflect off the inside handle toward the vehicular compartment inner side.

The light exit member mount member may be a decoration panel that is mounted to an upper portion of an inside handle bezel configuring a part of the handle housing portion. The decoration panel may include a projected wall portion that is projected toward the compartment inner side than an upper wall portion of the inside handle bezel. The light exit member may be arranged on a surface of the projected wall portion that faces a vehicular compartment outer side. The light transmission portion may be provided on a wall portion of the projected wall portion that faces the inside handle.

The light exit member is arranged on the vehicular compartment inner side in the decoration panel and the light transmission portion is provided on the wall portion of the projected wall portion that faces the inside handle. This configuration improves design compared to a configuration in which the light exit member and the light transmission portion are provided on the upper portion of the inside handle bezel. If the light exit member is arranged on the projected wall portion that is projected to the vehicular compartment inner side, the light exit member is easily provided on the vehicular compartment inner side than the light transmission portion.

The projected wall portion may include a side wall portion configuring a surface of the decoration panel that faces the vehicular compartment inner side and covering the light exit member from the vehicular compartment inner side, and a lower wall portion extending from a lower end of the side wall portion so as to cover the light exit member from a lower side and configuring a lower surface of the decoration panel. The lower wall portion may configure a part of the handle housing portion and have a vehicular compartment outer side end portion that configures the light transmission portion.

The projected wall portion covers the light exit member from the vehicular compartment inner side and the lower side. With this configuration, the light exit member is less likely to be seen by a passenger and this improves design. The light transmission portion is provided on the vehicular compartment outer side end portion of the lower wall portion. With this configuration, the light transmission portion is less likely to be seen by a passenger, and this improves design.

The lighting device may further include a light source provided on the vehicular door trim. The projected wall portion may extend in a vehicular front-rear direction. The light exit member may include a light entrance portion which light from the light source enters, and a light exit portion from which the light entering the light entrance portion exits toward the light transmission portion. The light exit member may be an elongated light guide member extending in a direction in which the projected wall portion extends.

The light guide member is used as the light exit member and this reduces a size of the light exit member and it is easier to arrange the light exit member to the projected wall portion compared to a configuration in which the light source is used as the light exit member. The light guide member is formed in an elongated shape extending in the extending direction of the projected wall portion, and with this configuration, the light guide member is easily mounted to the projected wall portion.

A part of a vehicular compartment outer side end portion of the decoration panel may be configured with a material having a high light transmission property to form the light transmission portion.

With such a configuration, the light transmission portion is formed integrally with the decoration panel and this reduces the number of parts. The light transmission portion is formed on the vehicular compartment outer side end portion of the decoration panel. With this configuration, the light transmission portion is less likely to be seen by a passenger and this improves design.

The decoration panel may include an upper panel and a lower panel. The upper panel may configure an upper portion of the decoration panel, and the lower panel may configure a lower portion of the decoration panel and the light exit member may be arranged on the lower panel. The lower panel may be provided between the upper panel and the inside handle bezel, and the light transmission portion may be formed on the lower panel. The lighting device may further include a light exit member fixing member provided to the lower panel that presses the light exit member from the vehicular compartment outer side to fix, and the light exit member fixing member may have a light reflecting surface on its surface.

Each of the components (the light exit member, the light exit member fixing member, the light transmission portion) is provided to the lower panel such that the components are provided as a unit. With this configuration, the components are mounted easily to the door trim compared to a configuration in which each of the components is separately mounted to the vehicular door trim. The decoration panel includes the upper panel and the lower panel, and each of the upper panel and the lower panel can be made of a different material or have a different design. In the present technology, a part of the decoration panel is required to be made of a material having a high light transmission property to form the light transmission portion. If the lower panel on which the light transmission portion is to be formed is made of a material having a high light transmission property, the upper panel that is separately provided from the lower panel is not necessarily made of a material having a high light transmission property. Accordingly, the decoration panel is designed freely. The surface of the light guide member fixing member that presses the light exit member from the vehicular compartment outer side is configured as the light reflection surface. Therefore, the light that reaches the surface of the light guide member fixing member reflects off the surface so as to be reused, and this improves light use efficiency.

Advantageous Effect of the Invention

The present technology provides a lighting device for a vehicle in which the light exit member is less likely to be seen on a surface of the inside handle.

MODES FOR CARRYING OUT THE INVENTION

Figure 1:
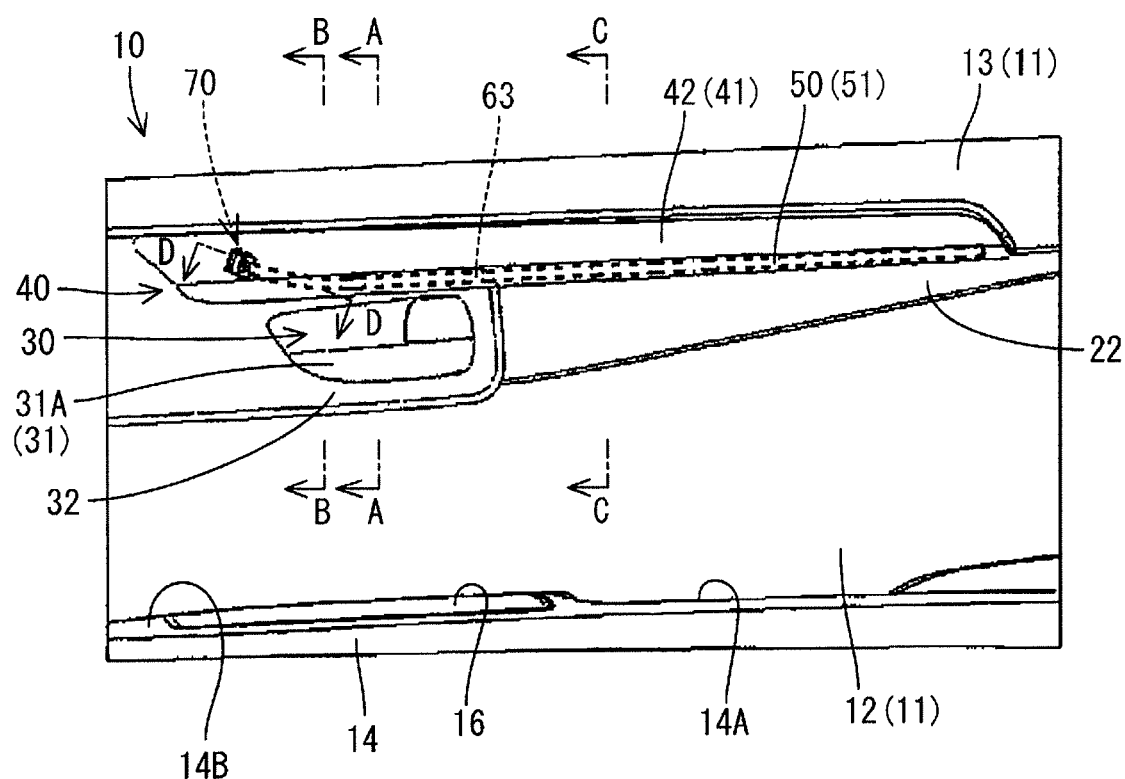
FIG. 1 is a front view of a main portion of a vehicular door trim to which a lighting device for a vehicle according to one embodiment of the present technology is mounted.

One embodiment of the present technology will be explained with reference to FIGS. 1 to 5. FIG. 1 is a front view of a main portion of a vehicular door trim 10 (a vehicular interior part) to which a lighting device for a vehicle 40 according to the present embodiment is mounted. The door trim 10 is an interior part that is mounted on a compartment inner side of an inner panel (not illustrated), and the vehicular door trim 10 and the inner panel configure a vehicular door.

The door trim 10 improves visual quality and comfort of a vehicle compartment. The door trim 10 includes a trim board 11. As illustrated in FIG. 1, the trim board 11 includes at least a main body 12 and an upper board 13 that is provided on an upper side of the main body 12. The trim board 11 is not necessarily configured by separate parts including the main body 12 and the upper board 13 but may be configured by one part that is integrally formed.

The main body 12 and the upper board 13 are connected to each other in a following method, for example. A mounting boss (not illustrated) is provided on one of the main body 12 and the upper board 13 and a mounting hole (not illustrated) is formed in another one of them, and the mounting boss is inserted to the mounting hole. Then, a distal end portion of the mounting boss is welded by welding means such as welding by ultrasonic waves. The main body 12 and the upper board 13 may be connected to each other by various connecting methods using screws or projection fitting.

The trim board 11 is formed from a synthetic resin such as polypropylene or a material obtained by mixing a synthetic resin and natural fibers (such as kenaf fibers). A skin 15 (see FIG. 3) is adhered to a part or an entire area of a vehicle compartment inner side of the trim board 11.

As illustrated in FIG. 1, the main body 12 includes an armrest 14 that is used as an armrest for a passenger. The armrest 14 is projected to a vehicular compartment inner side. An upper surface 14B of the armrest 14 extends along a horizontal direction. An opening 14A is formed on the upper surface 14B of the armrest 14 so as to be open upwardly. The opening 14A is used as a pull handle (not illustrated). A passenger puts his/her fingers in the pull handle to open and close the vehicular door.

An handle housing portion 30 is provided adjacent to a connection portion of the upper board 13 that is connected to the main body 12. The handle housing portion 30 is open toward the compartment inner side and an inside handle 31 (a holding portion 31A of the inside handle 31) is housed in the handle housing portion 30. The inside handle 31 is operated to open and close the vehicular door. A switch base 16 having a switch operation portion (not illustrated) is provided on a portion of the upper surface 14B of the armrest 14 that is located on a lower side of the handle housing portion 30.

Figure 3:
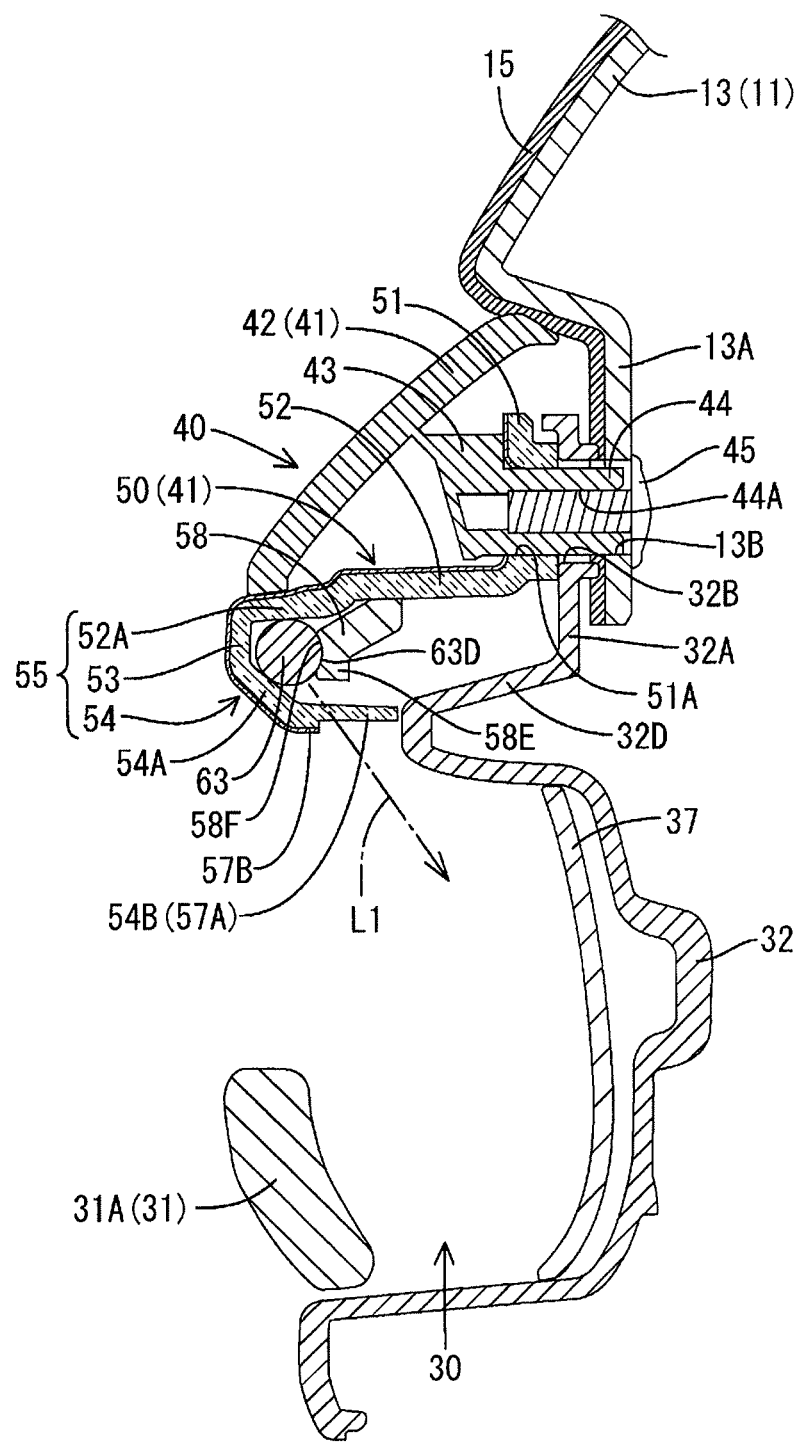
FIG. 3 is a cross-sectional view of the lighting device for a vehicle in FIG. 1 (taken along an A-A line in FIG. 1).

As illustrated in FIG. 3, the handle housing portion 30 is mainly configured with an inside handle bezel 32, an inside handle cover 37, and a decoration panel 41 (a part of the vehicular interior part) that is provided on an upper side of the inside handle bezel 32. In the following, the inside handle bezel 32 will be referred to as a bezel 32, and the inside handle cover 37 will be referred to as a cover 37.

As illustrated in FIG. 3, the bezel 32 is formed to be open toward the compartment inner side. The bezel 32 has a mounting projection (not illustrated) and is mounted to the trim board 11 via the projection. The cover 37 is provided to cover an inner wall of the bezel 32 from the compartment inner side. The cover 37 configures the inner wall of the handle housing portion 30.

The vehicular lighting device 40 of the present embodiment illuminates the handle housing portion 30 (a housing space that houses the inside handle 31) and the main body 12 (a surface to be illuminated 22 of the main body 12). The vehicular lighting device 40 includes an LED 61 (a light source), a light guide member 63 (a light exit member) that guides light emitting from the LED 61, and the decoration panel 41 (a light exit member mount member). The LED 61 and the light guide member 63 are provided on a compartment outer side of (a rear side of) the decoration panel 41.

Figure 2:
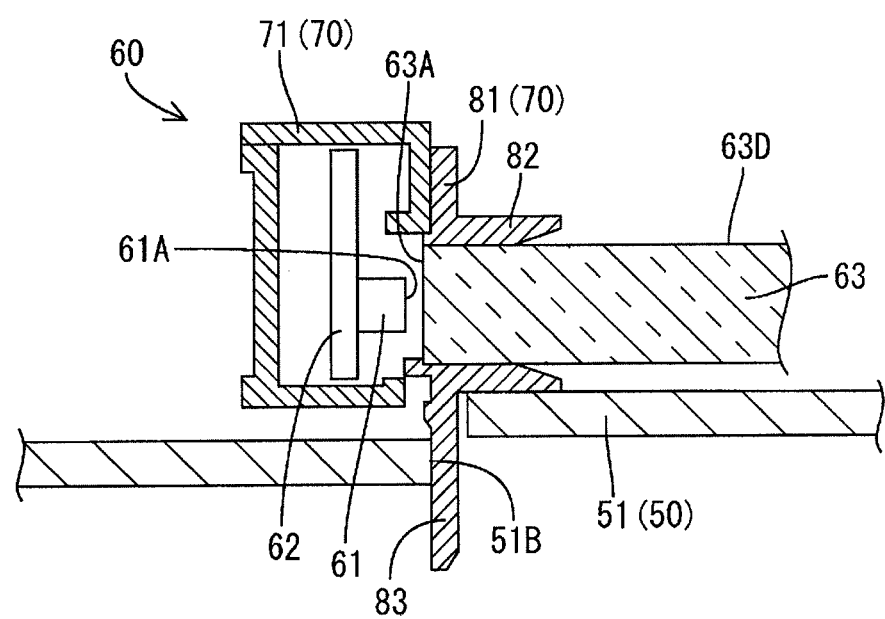
FIG. 2 is a cross-sectional view of a part of the lighting device for a vehicle in FIG. 1 that is adjacent to a light source (taken along a D-D line in FIG. 1).

As illustrated in FIG. 2, the LED 61 that is mounted on an LED board 62 is housed in a casing 70 and the casing 70 is mounted to the decoration panel 41. The LED 61 is connected to a power source (not illustrated) such as a battery that is mounted to a vehicle.

The light guide member 63 is formed to have substantially a circular cross section and configured with an elongated light guide material having flexibility and a bar-like shape. The light guide material is a material having light transmission property such as an acrylic resin and that guides light therein. The light guide materials described in Japanese Patent Unexamined Publication No. 2005-306233 and Japanese Patent Unexamined Publication No. 6-75120 may be used as the light guide material in the present embodiment.

As illustrated in FIG. 2, one end of the light guide member 63 in its longitudinal direction (an end close to a vehicle front side) is attached to the casing 70 and an end surface 63A of the one end (close to the LED 61) of the light guide member 63 faces a light emission surface 61A of the LED 61. Accordingly, the end surface 63A of the one end is a light entrance surface (a light entrance portion) that the light emitted from the LED 61 enters. In FIGS. 1 and 2, a left side corresponds to a vehicle front side and a right side corresponds to a vehicle rear side.

The casing 70 is configured with separate parts of an LED housing member 71 that houses the LED 61 and a light guide member fixing member 81 that fixes the one end of the light guide member 63. The LED housing member 71 is formed in substantially a box shape and the light guide member fixing member 81 is formed in a plate-like shape. The light guide member fixing member 81 is provided to cover a vehicle rear side surface of the LED housing member 71. The one end (the LED 61 side end) of the light guide member 63 is inserted (fitted) to a cylindrical portion 82 of the light guide member fixing member 81 and positioned with respect to the LED 61. In the present embodiment, the LED 61, the light guide member 63, and the casing 70 configure an LED unit 60.

The light guide member fixing member 81 includes a projection portion 83 that projects toward the decoration panel 41 (specifically toward a lower panel 50 that will be described later). The projection portion 83 is inserted through a through hole 51B that is formed to be through an upper end portion 51 of the lower panel 50 in a vehicle width direction. Accordingly, the casing 70 is positioned with respect to the decoration panel 41 in the vehicle front-rear direction. The casing 70 (the LED housing member 71 and the light guide fixing member 81) has a projection (not illustrated) and the projection is fitted to a mounting hole (not illustrated) formed in the lower panel 50. Accordingly, the casing 70 is fixed to the lower panel 50.

An outer peripheral surface 63D (a side surface) of the light guide member 63 is coated with fluorine resin. This accelerates the light guided through the light guide member 63 to exit outside. Total reflection of the light entering the end surface 63A of the light guide member 63 is repeated within the light guide member 63 to be guided through the light guide member 63. Then, the light exits from an entire area of the outer peripheral surface 63D. Accordingly, the whole light guide member 63 functions as a linear light source and illuminates its surroundings. Namely, the outer peripheral surface 63D of the light guide member 63 is a light exit surface (a light exit portion) from which the light entering the end surface 63A and guided into the light guide member 63 exits outside.

In the present embodiment, as illustrated in FIG. 1, the LED 61 (the casing 70) is arranged in the vehicle front side portion of the decoration panel 41. The inside handle bezel 32 (the handle housing portion 30) and the surface 22 to be illuminated in the main body 12 are arranged in the vehicle front-rear direction. The light guide member 63 extends along the extending direction of the decoration panel 41 (along the vehicle front-rear direction) so as to extend over an entire length including the handle housing portion 30 and the surface 22 to be illuminated. Accordingly, the light exiting from the light guide member 63 illuminates the handle housing portion 30 and the surface 22 to be illuminated over their entire length. The surface 22 to be illuminated is a compartment inner side surface (a light receiving portion) of the main body 12 that the light from the vehicular lighting device 40 (the light guide member 63) is illuminated.

Figure 5:
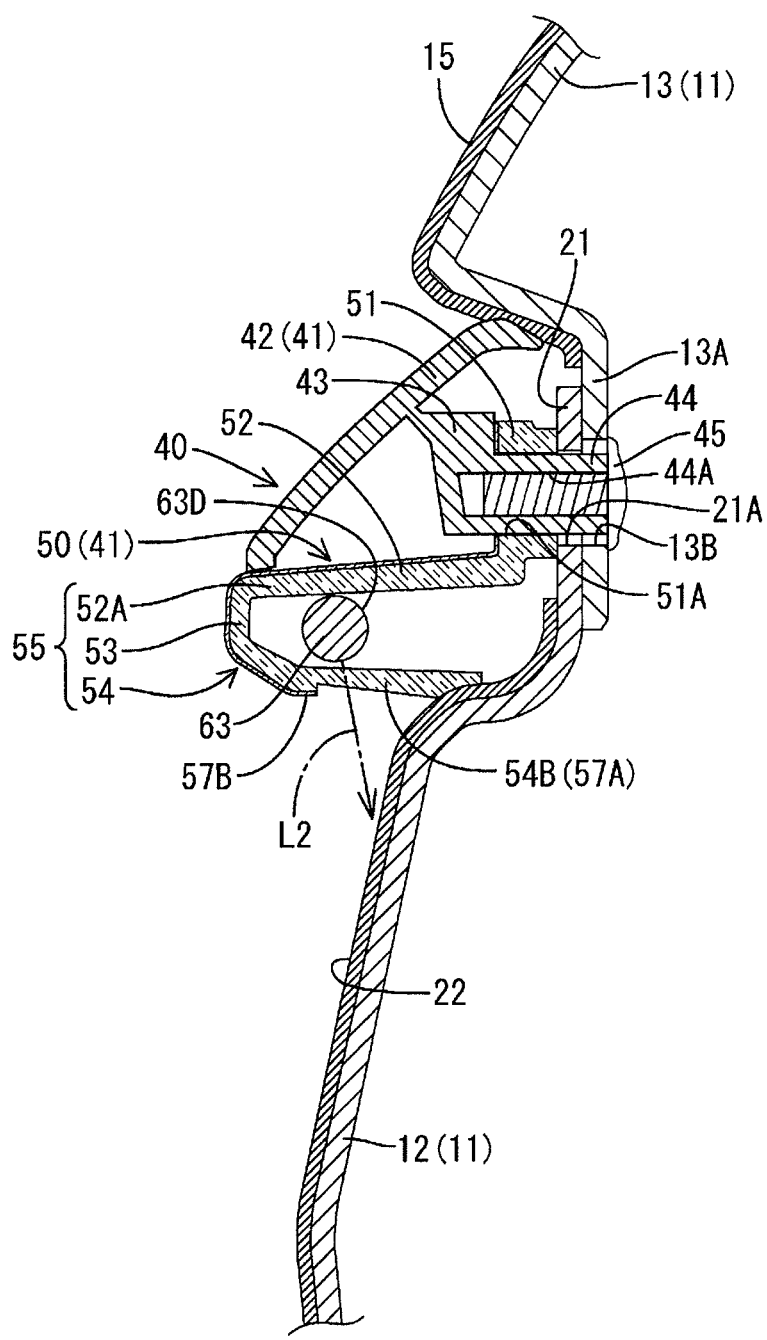
FIG. 5 is a cross-sectional view of the lighting device for a vehicle in FIG. 1 (taken along a C-C line in FIG. 1).

Next, a configuration of the decoration panel 41 will be explained. As illustrated in FIGS. 3 and 5, the decoration panel 41 is provided on an upper side of the inside handle 31 and the surface 22 of the main body 12. A lower end portion 13A of the upper board 13 is recessed (projected) toward the compartment outer side to form a step, and an upper end portion 32A of the bezel 32 is recessed (projected) toward the compartment outer side to form a step. With this configuration, the lower end portion 13A and the upper end portion 32A overlap each other to form a housing portion (a portion at which the upper board 13 and the bezel 32 are connected to each other). A part of the decoration panel 41 is housed in the housing portion.

As illustrated in FIG. 1, the decoration panel 41 extends in the vehicle front-rear direction and is configured with separate parts of an upper panel 42 and the lower panel 50. The upper panel 42 configures an upper portion of the decoration panel 41 and the lower panel 50 configures a lower portion of the decoration panel 41. As illustrated in FIG. 3, the upper panel 42 is curved and inclined to the compartment outer side (the right side in FIG. 3) as is close to the upper side. The lower panel 50 is arranged between the upper panel 42 and the bezel 32 (or the surface 22 of the main body 12).

A flange 43 extends from a compartment outer side surface of the upper panel 42, and a cylindrical mounting boss 44 is formed to be projected from the flange 43 toward the compartment outer side. An insertion hole 13B is formed through a lower end portion 13A of the upper board 13 so as to be through in the vehicle width direction. An insertion hole 32B is formed through an upper end portion 32A of the bezel 32 so as to be through in the vehicle width direction. An insertion hole 51A is formed in the upper end portion 51 of the lower panel 50 so as to be through the vehicle width direction.

The mounting boss 44 is inserted through the insertion hole 51A, the insertion hole 43B, and the insertion hole 13B. A screw mounting hole 44A is formed in the mounting boss 44 so as to extend along a center shaft of the mounting boss 44. The screw mounting hole 44A is open to the compartment outer side. The mounting boss 44 is inserted through the insertion hole 51A, the insertion hole 32B, and the insertion hole 13B from the compartment inner side in this order, and then, the screw 45 is inserted to the screw mounting hole 44A from the compartment inner side. Accordingly, the decoration panel 41 (the upper panel 42 and the lower panel 50) is mounted to the upper board 13 and the bezel 32. The mounting bosses 44 and the insertion holes 51A, 32B, 13B are formed along the vehicle front-rear direction.

As illustrated in FIG. 5, the mounting boss 44 is provided on the upper side of the surface 22 of the main body 12. An insertion hole 21A is formed in an upper end portion 21 of the main body 12. The mounting boss 44 is inserted through the insertion hole 21A. The mounting boss 44 is inserted through the insertion hole 51A, the insertion hole 21A and the insertion hole 13B from the compartment inner side, and then, the screw 45 is inserted into the mounting boss 44 from the compartment outer side and the mounting boss 44 is fixed.

The lower panel 50 includes an upper wall portion 52, a side wall portion 53, and a lower wall portion 54. The upper wall portion 52 extends horizontally from the lower end of the upper end portion 51 toward the compartment inner side. The side wall portion 53 extends downwardly from the compartment inner side end portion of the upper wall portion 52. The lower wall portion 54 extends from the lower end portion of the side wall portion 53 toward the compartment outer side.

The distal end portion 52A (a portion of the upper wall portion 52 that is on the compartment inner side than an upper wall portion 43D of the bezel 32), the side wall portion 53 and the lower wall portion 54 of the upper wall portion 52 configure a projected wall portion 55. The projected wall portion 55 is formed to be projected to the compartment inner side than the upper wall portion 32D of the bezel 32. The projected wall portion 55 is formed to be open toward the compartment outer side and have substantially a U-shaped cross section. The projected wall portion 55 extends along the vehicle front-rear direction. The elongated light guide member 63 is housed in a space within the projected wall portion 55 (a space surrounded by the projected wall portion 55) so as to extend along the extending direction of the projected wall portion 55.

Specifically, the light guide member 63 is provided (mounted) on a compartment outer side surface of the projected wall portion 55 (provided at the projected end of the lower panel 50). The side wall portion 53 is provided to cover the light guide member 63 from the compartment inner side and configures a compartment inner side surface of the decoration panel 41. The lower wall portion 54 configures a lower surface of the decoration panel 41 and is provided to cover the light guide member 63 from the lower side. A portion of the lower wall portion 54 that is provided on the vehicle front side configures the handle housing portion 30 with the bezel 32.

Figure 4:
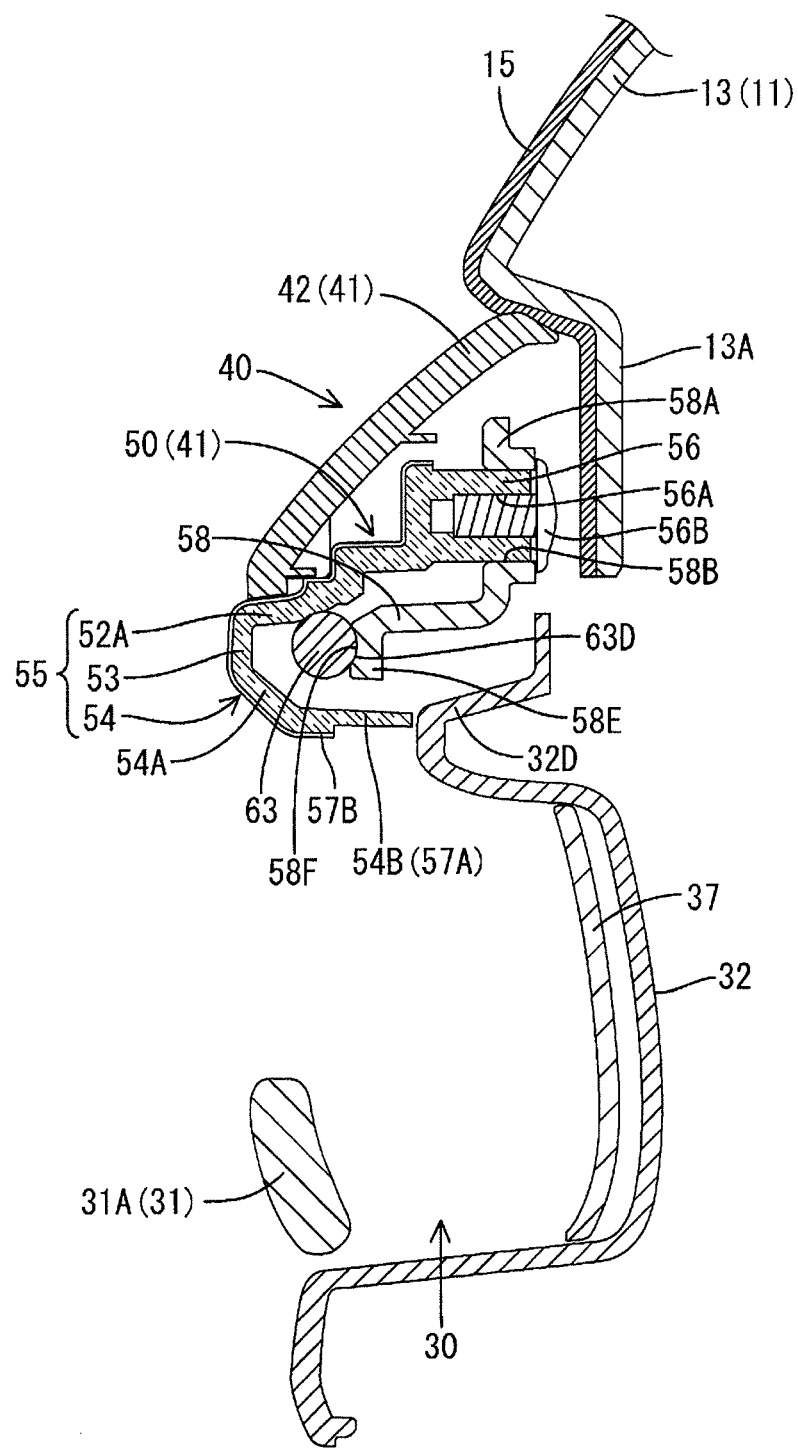
FIG. 4 is a cross-sectional view of the lighting device for a vehicle in FIG. 1 (taken along a B-B line in FIG. 1).

As illustrated in FIGS. 3 and 4, a light guide member fixing member 58 (a light exit member fixing member) is attached to the lower panel 50. The light guide member fixing member 58 presses the light guide member 63 from the compartment outer side and fixes it. As illustrated in FIG. 4, a mounting boss 56 is projected from an upper end portion of the lower panel 50 toward the compartment outer side. An insertion hole 58 is formed in an upper end portion 58A of the light guide member fixing member 58.

A screw mounting hole 56A is formed in the mounting boss 56 so as to extend along a center shaft of the mounting boss 56. The screw mounting hole 56A is open to the compartment outer side. The mounting boss 56 is inserted through the insertion hole 58A of the light guide member fixing member 58 from the compartment inner side and thereafter, the screw 56B is inserted through the screw insertion hole 56A. Accordingly, the light guide member fixing member 58 is mounted to the lower panel 50. The light guide member fixing member 58 extends along the extending direction of the light guide member 63 (the vehicle front-rear direction) and the mounting screws 56 and the insertion holes 58B are formed along the vehicle front-rear direction.

The light guide member fixing member 58 is formed in substantially a plate shape and an end portion of the light guide member fixing member 58 close to the compartment inner side is a contact portion 58E that is in contact with the light guide member 63. The light guide member fixing member 58 (the contact portion 58E) extends along a longitudinal direction of the light guide member 63 (in the vehicle front-rear direction), and presses an entire length of the light guide member 63 from the compartment outer side.

A recess 58F is formed on a surface of the contact portion 58E that faces the light guide member 63. The recess 58F is recessed to correspond to an outer peripheral surface 63D of the light guide member 63. A part of the light guide member 63 is fitted to the recess 58F and this surely fixes the light guide member 63. As is explained above, according to the present embodiment, the decoration panel 41 (the upper panel 42 and the lower panel 50), the light guide member 63, and the light guide member fixing member 58 are integrally assembled and configured as a unit.

The lower wall portion 54 of the lower panel 50 includes an inclined portion 54A. The inclined portion 54A is inclined such that a basal end extends downwardly to be close to the compartment inner side. A light transmission portion 54B extends substantially horizontally from a compartment outer side end portion of the inclined portion 54A (a lower end portion). The light exiting from the light guide member 63 passes through the light transmission portion 54B toward the handle housing portion 30. The light transmission portion 54B is provided on the wall portion (the lower wall portion 54) of the projected wall portion 55 that faces the inside handle 31.

In the present embodiment, the lower panel 50 is configured with a base member 57A and a light blocking layer 57B. The base member 57A is made of a synthetic resin material having high light transmission property or high transparency such as acrylic or polycarbonate. The light blocking layer 57B covers a surface of the base member 57A that faces the compartment inner side. No light blocking layer 57B is formed on the light transmission portion 54B, and the base member 57A corresponding to the light transmission portion 54B does not include the light blocking layer 57B. Accordingly, the light transmits through the light transmission portion 54B towards the handle housing portion 30. Namely, at least a part of the compartment outer side end portion of the decoration panel 41 is formed of a material having high light transmission and forms the light transmission portion 54B. The light transmission portion 54B is integrally formed with the lower panel 50.

The light blocking layer 57B is formed by coating the surface of the base member 57A with a material having a light blocking property or adhering a film having a light blocking property to the surface of the base member 57A. The light blocking layer 57B may be formed by coating with plating and this improves design. However, examples of the light blocking layer 57B is not limited thereto and the light blocking layer 57B may be formed with any other methods as long as it has a light blocking property.

In the present embodiment, as illustrated in FIG. 3, the light guide member 63 is provided in the lower panel 50 so as to be on the compartment inner side (the left side in FIG. 3) than the light transmission portion 54B. The light guide member 63 and the inside handle 31 are provided so as not to be shifted from each other in a compartment inner-outer direction (a left-right direction in FIGS. 3 and 4). Namely, the light blocking layer 57B is provided between the light guide member 63 and the inside handle 31.

The light guide member fixing member 58 has a surface that is in white to form a light reflection surface. The contact portion 58E of the light guide member fixing member 58 is formed to cover the light guide member 63 from the compartment outer side. A space is provided between a lower surface of the contact portion 58E of the light guide member fixing member 58 and the light transmission portion 54B.

Accordingly, the light exiting from the outer peripheral surface 63D of the light guide member 63 (illustrated by a light ray L1 in FIG. 3) passes through the space between the contact portion 58E and the light transmission portion 54B and reaches the light transmission portion 54B. The light that reaches the light transmission portion 54B passes through the light transmission portion 54B and is guided to the handle housing portion 30.

The light transmission portion 54B is formed to extend along the extending direction of the inside handle 31 (the front-rear direction of a vehicle). With this configuration, an entire length (in the vehicle front-rear direction) of the inside handle 31 can be seen (illuminated) by the linear light exiting from the light guide member 63. As illustrated in FIG. 5, the light transmission portion 54B of the lower panel 50 extends to contact the upper portion of the surface 22 of the main body 12. With this configuration, the surface 22 of the main body 12 is illuminated by the light exiting from the light guide member 63 (illustrated by the light ray L2 in FIG. 5).

Next, advantageous effects of the present embodiment will be explained. According to the present embodiment, the light exiting from the light guide member 63 is directed toward the handle housing portion 30 via the light transmission portion 54B. Accordingly, the inside of the handle housing portion 30 is illuminated by the light and the inside handle 31 can be seen effectively. The light guide member 63 is arranged in the decoration panel 41 on the compartment inner side than the light transmission portion 54B.

With this configuration, the light exiting from the light guide member 63 toward the compartment outer side is directed to the handle housing portion 30. Namely, the light exiting from the light guide member 63 toward the compartment inner side is less likely to be illuminated directly to the inside handle 31. Accordingly, the light exiting from the light guide member 63 is less likely to reflect off the inside handle 31 to be directed to the compartment inner side. From a passenger's view who is in the compartment inner side, the light guide member 63 is less likely to seen on the surface of the inside handle 31 and the passenger is less likely to feel brightness. The configuration of the present embodiment is very effective for the inside handle 31 having a surface with high light reflectance (for example, plating).

The light guide member 63 and the inside handle 31 are arranged so as not to be shifted from each other in the compartment inner-outer direction or the light guide member 63 is arranged on a compartment inner side than the inside handle 31.

With this configuration, the light exiting from the light guide member 63 and directing to the compartment inner side is less likely to illuminate directly the inside handle 31. Accordingly, the light is less likely to reflect off the inside handle 31 toward the compartment inner side.

The light exit member mount member is the decoration panel 41 that is mounted to an upper portion of the inside handle bezel 32 that configures a part of the handle housing portion 30. The decoration panel 41 includes a projected wall portion 55 that is formed such that a projected end is projected further to the compartment inner side than the upper wall portion 32D of the inside handle bezel 32. The light guide member 63 is provided on a compartment outer side surface of the projected wall portion 55 and the light transmission portion 54B is provided on the lower wall portion 54 of the projected wall portion 55.

The light guide member 63 is arranged on the compartment inner side in the decoration panel 41 and the light transmission portion 54B is provided on the lower wall portion 54 of the projected wall portion 55. This configuration improves design compared to a configuration in which the light guide member 63 and the light transmission portion 54B are provided on the upper portion of the inside handle bezel 32. If the light guide member 63 is arranged on a projected end portion of the projected wall portion 55 that is projected to the compartment inner side, the light guide member 63 is easily provided on the compartment inner side than the light transmission portion 54B.

The projected wall portion 55 includes the side wall portion 53 and the lower wall portion 54. The side wall portion 53 configures a compartment inner side surface of the decoration panel 41 and covers the light guide member 63 from the compartment inner side. The lower wall portion 54 extends from a lower end of the side wall portion 53 so as to cover the light guide member 63 from the lower side. The lower wall portion 54 configures a lower surface of the decoration panel 41. The lower wall portion 54 configures a part of the handle housing portion 30 and a compartment outer side end portion of the lower wall portion 54 is the light transmission portion 54B.

The projected wall portion 55 covers the light guide member 63 from the compartment inner side and the lower side. With this configuration, the light guide member 63 is less likely to be seen by a passenger and this improves design. The light transmission portion 54B is provided on the compartment outer side end portion of the lower wall portion 54. With this configuration, the light transmission portion 54B is less likely to be seen by a passenger, and this improves design.

The lighting device for a vehicle includes the LED 61. The projected wall portion 55 is formed to extend in the vehicle front-rear direction. The light exit member is the light guide member 63 including the end surface 63A and the outer peripheral surface 63D. The light from the LED 61 enters the end surface 63A and the light entering the end surface 63A exits from the outer peripheral surface 63D toward the light transmission portion 54B. The light guide member 63 is formed in an elongated shape extending in the extending direction of the projected wall portion 55.

The light guide member 63 is used as the light exit member and this reduces a size of the light exit member and it is easier to arrange the light exit member to the projected wall portion 55 compared to a configuration in which the light source is used as the light exit member. The light guide member 63 is formed in an elongated shape extending in the extending direction of the projected wall portion 55, and with this configuration, the light guide member is easily mounted to the projected wall portion 55.

At least a part of the compartment outer side end portion of the decoration panel 41 is made of a material having a high light transmission property (the base member 57A) to form the light transmission portion 54B.

With this configuration, the light transmission portion 54B is formed integrally with the decoration panel 41 (the lower panel 50) and this reduces the number of parts. The light transmission portion 54B is formed on the compartment outer side end portion of the decoration panel 41. With this configuration, the light transmission portion 54B is less likely to be seen by a passenger and this improves design.

The decoration panel 41 includes the upper panel 42 and the lower panel 50. The upper panel 42 configures the upper portion of the decoration panel 41, and the lower panel 50 configures the lower portion of the decoration panel 41 and the light guide member 63 is arranged to the lower panel 50. The lower panel 50 is arranged between the upper panel 42 and the inside handle bezel 32. The light guide member fixing member 58 is mounted to the lower panel 50 to press the light guide member 63 from the compartment outer side to fix it. The light guide member fixing member 58 has a light reflection surface. The light transmission portion 54B is provided on the lower panel 50.

Each of the components (the light guide member 63, the light guide member fixing member 58, the light transmission portion 54B) is provided to the lower panel 50 such that the components are provided as a unit. With this configuration, the components are mounted easily to the door trim 10 compared to a configuration in which each of the components is separately mounted to the vehicular door trim 10.

The decoration panel 41 includes the upper panel 42 and the lower panel 50, and each of the upper panel 42 and the lower panel 50 can be made of a different material or have a different design. In the present embodiment, a part of the decoration panel 41 is required to be made of a material having a high light transmission property to form the light transmission portion 54B. If the lower panel 50 on which the light transmission portion 54B is to be formed is made of a material having a high light transmission property, the upper panel 42 that is separately provided from the lower panel 50 is not necessarily made of a material having a high light transmission property. Accordingly, the decoration panel 41 is designed freely.

The surface of the light guide member fixing member 58 that presses the light guide member 63 from the compartment outer side is configured as the light reflection surface. Therefore, the light that reaches the surface of the light guide member fixing member 58 reflects off the surface so as to be reused, and this improves light use efficiency.

OTHER EMBODIMENTS

The present invention is not limited to the embodiment as described above with reference to the drawings. For example, the present technology may include following embodiments.

(1) In the above embodiment, the decoration panel 41 is used as the light exit member mount member on which the light guide member 63 is arranged. However, it is not limited thereto. The light exit member mount member is not limited to the decoration panel 41 but may be any other part. For example, the inside handle bezel 32 may be used as the light exit member mount member.

(2) In the above embodiment, the light guide member 63 is used as the light exit member. However, it is not limited thereto. Any component may be used as the light exit member as long as it exits light and the light source may be used as the light exit member. For example, in the above embodiment, the LED 61 may be arranged on the decoration panel 41 instead of the light guide member 63 and the light exiting from the LED 61 may directly illuminate the handle housing portion 30.

Figure 6:
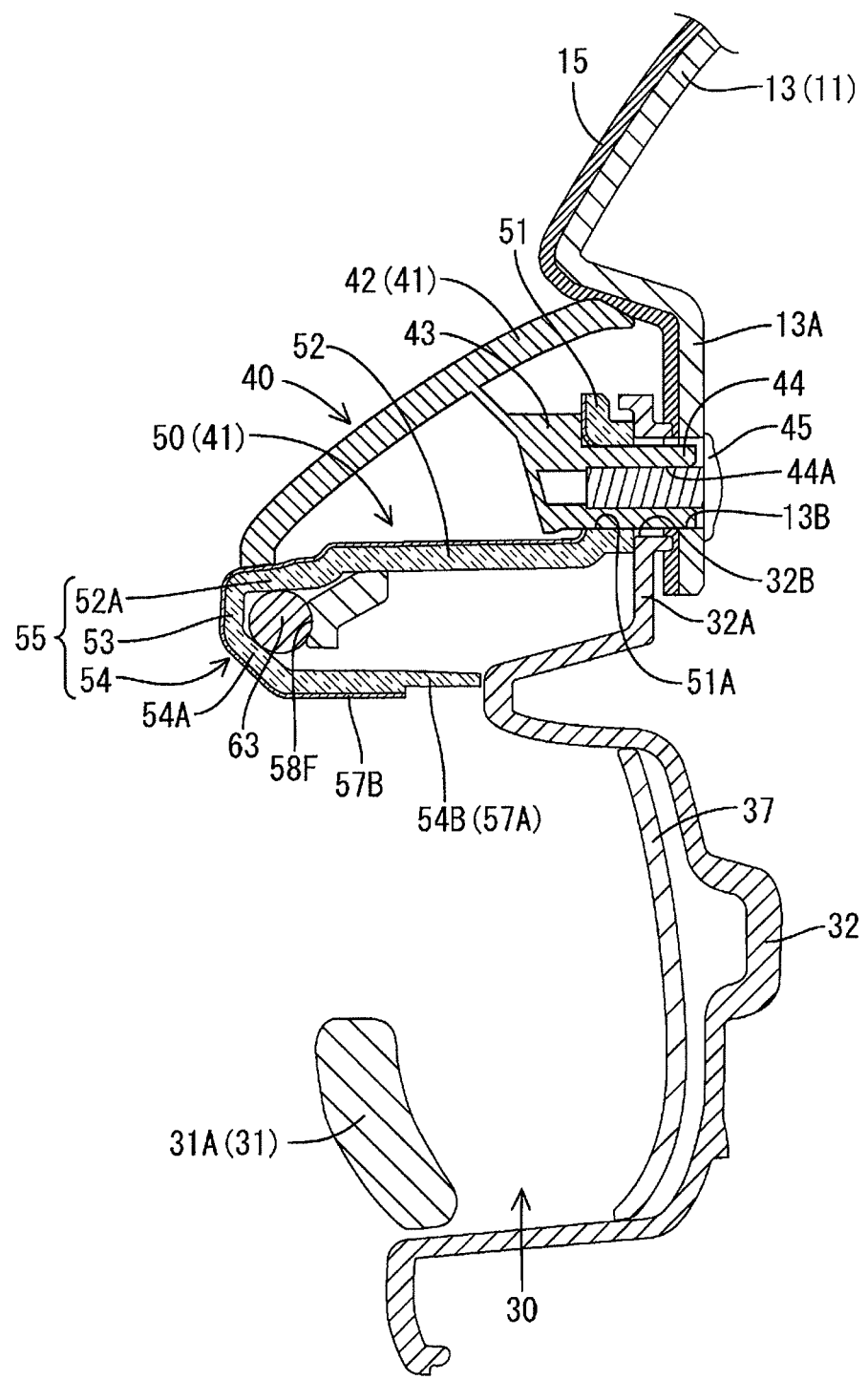
FIG. 6 is a cross-sectional view illustrating another embodiment of the present technology.

(3) In the above embodiment, the light guide member 63 is arranged so as not to be shifted from the inside handle in the compartment inner-outer direction. However, it is not limited thereto. For example, as illustrated in FIG. 6, the light guide member 63 may be arranged on the compartment inner side than the inside handle 31.

(4) In the above embodiment, the decoration panel 41 is configured with separate parts of the upper panel 42 and the lower panel 50. However, it is not limited thereto. In the present embodiment, the decoration panel is referred to as a panel having a good design and the shape or configuration thereof may be altered if necessary.

(5) In the above embodiment, a part of the decoration panel 41 (the lower panel 50) is configured with a member having a high light transmission property to form the light transmission portion 54B. However, it is not limited thereto. The light transmission portion 54B may be configured with any member as long as it can transmit the light from the light guide member 63 to the handle housing portion 30. For example, a through hole through which light transmits may be formed in the lower panel 50 and configured as the light transmission portion.

(6) In the above embodiment, the vehicular lighting device 40 illuminates the handle housing portion 30 and the surface 22 of the main body 12. However, it is not limited thereto. The vehicular lighting device 40 necessarily illuminates at least the handle housing portion 30.

(7) In the above embodiment, the LED 61 is used as the light source. However, it is not limited thereto. For example, various kinds of light sources such as a filament lamp (bulb), a fluorescent tube, and a halogen lamp may be used as the light source.

EXPLANATION OF SYMBOLS

10: Vehicular door trim, 30: Handle housing portion, 31: Inside handle, 32: Inside handle bezel, 32D: Upper wall portion of inside handle bezel, 40: Vehicular lighting device, 41: Decoration panel (Light exit member mount member), 42: Upper panel, 50: Loser panel, 53: Side wall portion, 54: Lower wall portion (Wall portion of projected wall portion that faces inside handle), 54B: Light transmission portion, 55: Projected wall portion, 58: Light guide member fixing member (Light exit member fixing member), 61: LED (Light source), 63: Light guide member (Light exit member), 63A: End surface of light guide member (Light entrance portion), 63D: Outer peripheral surface of light guide member (Light exit portion)

The invention claimed is:

1. A lighting device for a vehicle provided to a vehicular door trim to illuminate a handle housing portion in which an inside handle is housed, the lighting device comprising:
    a light exit member extending in a vehicular front-and-rear direction, the light exit member including a light entrance portion which light from a light source enters, and a light exit portion through which the light entering the light entrance portion exits;
    a light exit member mount member provided on an upper side of the inside handle and where the light exit member is arranged, the light exit member mount member including a light blocking portion having a light blocking property, the light blocking portion being included in a portion of the light exit member mount member that is below the light exit member; and
    a light transmission portion provided to the light exit member mount member and through which light exiting the light exit member through the light exit portion is directed to the handle housing portion, the light transmission portion extending in the vehicular front-andrear direction, the light transmission portion being below the light exit member and being offset from the light exit member,
wherein
the light exit portion of the light exit member is arranged farther away from the vehicular door trim than the light transmission portion in a vehicular width direction that is substantially perpendicular to the vehicular front-and-rear direction, and
the light blocking portion blocks light exiting the light exit member vertically downward from being directed to the inside handle.

2. The lighting device according to claim 1, wherein the light exit member and the inside handle are arranged to be away from the vehicular door trim with a substantially same distance in the vehicular width direction or the light exit member is arranged to be farther away from the vehicular door trim than the inside handle in the vehicular width direction.

3. The lighting device according to claim 2, wherein the light exit member mount member is a decoration panel that is mounted to an upper portion of an inside handle bezel configuring a part of the handle housing portion,
the decoration panel includes a projected wall portion that extends in a direction away from the inside handle bezel,
the light exit member is arranged on a surface of the projected wall portion that faces the inside handle bezel, and
the light transmission portion is provided on a wall portion of the projected wall portion that faces the inside handle.

4. The lighting device according to claim 3, wherein the projected wall portion includes:
a side wall portion configuring a surface of the decoration panel that covers the light exit member from a side of the light exit member opposite the inside handle bezel; and
a lower wall portion extending from a lower end of the side wall portion so as to cover the light exit member from a lower side and configuring a lower surface of the decoration panel, the lower wall portion configuring a part of the handle housing portion, the lower wall portion having a portion that comprises the light transmission portion.

5. The lighting device according to claim 4, further comprising a light source provided on the vehicular door trim, wherein
the projected wall portion extends in the vehicular front-and-rear direction,
and
wherein the light exit member is an elongated light guide member extending in a direction in which the projected wall portion extends.

6. The lighting device according to claim 2, wherein the light exit member and the inside handle are offset from the light transmission portion in a vertical direction.

7. The lighting device according to claim 2, wherein the inside handle is arranged farther away from the vehicular door trim than the light transmission portion in the vehicular width direction.

8. The lighting device according to claim 3, further comprising a light source provided on the vehicular door trim, wherein
the projected wall portion extends in the vehicular front-and-rear direction,
and
wherein the light exit member is an elongated light guide member extending in a direction in which the projected wall portion extends.

9. The lighting device according to claim 1, wherein
the light exit member mount member is a decoration panel that is mounted to an upper portion of an inside handle bezel,
the decoration panel includes a projected wall portion that extends in a direction away from the inside handle bezel,
the light exit member is arranged on a surface of the projected wall portion that faces the inside handle bezel, and
the light transmission portion is provided on a wall portion of the projected wall portion that faces the inside handle.

10. The lighting device according to claim 9, wherein the projected wall portion includes:
a side wall portion configuring a surface of the decoration panel that covers the light exit member from a side of the light exit member opposite the inside handle bezel; and
a lower wall portion extending from a lower end of the side wall portion so as to cover the light exit member from a lower side and configuring a lower surface of the decoration panel, the lower wall portion configuring a part of the handle housing portion, the lower wall portion having a portion that comprises the light transmission portion.

11. The lighting device according to claim 10, further comprising a light source provided on the vehicular door trim, wherein
the projected wall portion extends in the vehicular front-and-rear direction,
and
wherein the light exit member is an elongated light guide member extending in a direction in which the projected wall portion extends.

12. The lighting device according to claim 9, further comprising a light source provided on the vehicular door trim, wherein
the projected wall portion extends in the vehicular front-and-rear direction, and
wherein the light exit member is an elongated light guide member extending in a direction in which the projected wall portion extends.

13. The lighting device according to claim 9, wherein a part of a vehicular compartment outer side end portion of the decoration panel is configured with a material having a light transmission property to form the light transmission portion.

14. The lighting device according to claim 13, wherein
the decoration panel includes an upper panel and a lower panel, the upper panel configuring an upper portion of the decoration panel, and the lower panel configuring a lower portion of the decoration panel and on which the light exit member is arranged,
the lower panel is provided between the upper panel and the inside handle bezel, and
the light transmission portion is formed on the lower panel, the lighting device further comprising:
a light exit member fixing member provided to the lower panel that presses the light exit member toward the projected wall portion and fixes the light exit member, the light exit member fixing member having a light reflecting surface on its surface.

15. The lighting device according to claim 1, wherein the light exit member and the inside handle are offset from the light transmission portion in a vertical direction.

16. The lighting device according to claim 1, wherein
the inside handle is arranged farther away from the vehicular door trim than the light transmission portion in the vehicular width direction.

17. The lighting device according to claim 1, wherein
the light exit member mount member includes a projected wall portion that projects in a direction away from the vehicular door trim,
the projected wall portion includes an upper wall portion, a side wall portion, and a lower wall portion and the projected wall portion has a U-shape having an opening that opens toward the vehicular door trim,
the light exit member is arranged in a space within the projected wall portion having the U-shape, and
the light transmission portion is continuous with respect to the lower wall portion.

18. The lighting device according to claim 17, wherein
the light blocking portion is provided on an outer surface of each of the upper wall portion, the side wall portion, and the lower wall portion, the outer surface being opposite to a surface that faces the space within the projected wall portion.

19. The lighting device according to claim 17, wherein
the projected wall portion extends in the vehicular front-and-rear direction, and
the light exit member is an elongated light guide member extending in a direction in which the projected wall portion extends.

20. The lighting device according to claim 1, wherein
the light exit member has a portion that is on an upper side with respect to the inside handle and an entirety of which does not overlap the light transmission portion.

* * * * *